United States Patent [19]

Gibney

[11] Patent Number: 4,901,438

[45] Date of Patent: Feb. 20, 1990

[54] SHIELDED CABLE CUTTING DEVICE

[76] Inventor: Brian E. Gibney, 4701 Americana Dr., #304, Annandale, Va. 22003

[21] Appl. No.: 288,442

[22] Filed: Dec. 22, 1988

[51] Int. Cl.⁴ .............................................. B21F 13/00
[52] U.S. Cl. ........................................ 30/90.3; 30/91.1
[58] Field of Search ....................... 30/90.3, 91.1, 500, 30/276, 272 A, 92.5, 272.1; 81/9.41, 9.4, 9.44

[56] References Cited

U.S. PATENT DOCUMENTS 3,093,023  6/1963  Vail .................................. 30/91.1 X
3,831,387  12/1974  Ducret .................................. 30/90.3

FOREIGN PATENT DOCUMENTS 280527  8/1988  European Pat. Off. .............. 30/500

Primary Examiner—Douglas D. Watts
Attorney, Agent, or Firm—Jerry C. Lyell

[57] ABSTRACT

A battery powered hand-held rotary cutting tool for use on BX cable and the like comprising a power unit and attached battery pack with a projecting drive shaft to which is affixed a rotary cutting blade. Said power unit and battery pack fit within a containment shell which is fitted with a top cover which closes onto the containment shell and simultaneously depresses an activation switch in said power unit. A projecting portion of said cover further operates to press a segment of shielded cable into contact with the rotary cutting blade contemporaneously with the activation of said power unit. Said top cover is fashioned with a spring on the inner cover such that when the cover is released by the mechanic or operator, the power activation switch is released thereby. The invention is designed to facilitate one-handed cutting of shielded cable by means of squeezing the device onto segments of cable wherever the mechanic desires to cut the shield.

4 Claims, 2 Drawing Sheets

SHIELDED CABLE CUTTING DEVICE

BACKGROUND OF THE INVENTION

Residential and commercial building construction requires the use of large amounts of flexible electrical cable to provide power to lights, fans and other electric equipment which is built into modern structures. The cable of choice in many projects is the so-called BX style cable which consists of a bundle of individual wires protected by a continuous helical metal sheath. The cable arrives at the project wrapped on spools from which lengths of cable can be drawn. Lengths of cable are pulled through spaces in walls and overhead ceilings to reach electrical installations. The lengths of cable are difficult to anticipate accurately and, therefore, it is necessary to cut the cable to length after it has been pulled into position.

The fact that many cuts in the sheath have to be made, and in tight spaces as well, requires the use or small, portable hand tools in order to achieve economical use of cable and manpower.

Several BX cable cutters and improvements thereof have been patented, and are widely used in the construction industry. Such cable cutters as are used are either hand powered (hand cranked) or, if electrically powered, are inconvenient to use in tight spaces.

The present invention is an improvement in the field of hand-held cable cutters in that it is a self contained, electrically powered cutting device which has the unique feature of being designed for operation in one hand of the mechanic thereby leaving the other hand free to pull and position the cable or other activities.

SUMMARY OF THE INVENTION

The present invention is a hand-held cutting tool for use on BX type shielded cable and the like.

The device consists of an electrically powered rotary cutter which can be operated with one hand to cut the covers of shielded cable along the longitudinal axis of the cable. The shield or sheath can then be peeled away to expose the wires contained therein.

The device is an assembly consisting of a power unit and projecting drive shaft with a rotary cutting blade or saw affixed at the end of the shaft, a lower containment shell into which the power unit is laid with the rotary cutting blade projecting outside of said containment shell, and a hinged cover that forms the top surface of the containment shell.

The power unit consists of an electric motor and attached rechargeable battery pack. The combination of motor and battery pack are configured as a unit to fit snugly into the containment shell with the drive shaft projecting through a slot cut into one end of the containment shell.

The cover is fashioned with pinned or hinged attachments to the containment shell near the end opposite the slotted end. The cover is also fashioned as a single, continuous element with an arcuate, downturned portion opposite the hinge, which downturned portion overextends the length of the containment shell and is centered over the rotary cutter. To the inner surface of the cover is affixed a downwardly projecting leaf spring which bears upon the surface of the power unit when it is in the containment shell. The leaf spring is configured to hold the cover partially open with minimum tension until the user squeezes the shell and cover together with ordinary hand pressure.

The electric motor of the power unit is fashioned with a spring loaded contact switch which projects outward from the motor far enough to come into contact with the inner surface of the cover as it is being closed. With the cover fully closed the switch is depressed thereby activating the motor.

The arcuate, downturned portion of the cover forms a channel into which a shielded electrical cable can be placed. With the cover and shell pressed together as previously described, a segment of shielded cable is pressed into contact with the rotary cutting blade which is simultaneously activated as the cover is closed onto the spring loaded contact switch. By momentarily releasing the pressure on the cover the rotary cutter can be moved along the cable to extend the length of cut. The user will normally hold the device with the containment shell cradled in the palm of the hand and with the thumb pressing down on the cover. By repeated applications of thumb pressure the user can make successive cuts along a shielded cable with an ease and facility not afforded by existing manual cable cutters.

The design of the containment shell and cover permits the cover to swing open through a limited angle: sufficient to permit the user to remove the power unit from the shell but small enough to prevent the power unit from falling out accidentally.

BRIEF DESCRIPTION OF THE DRAWINGS

The invention may be further understood by reference to the drawings.

DESCRIPTION OF THE PREFERRED EMBODIMENT

Figure 1:
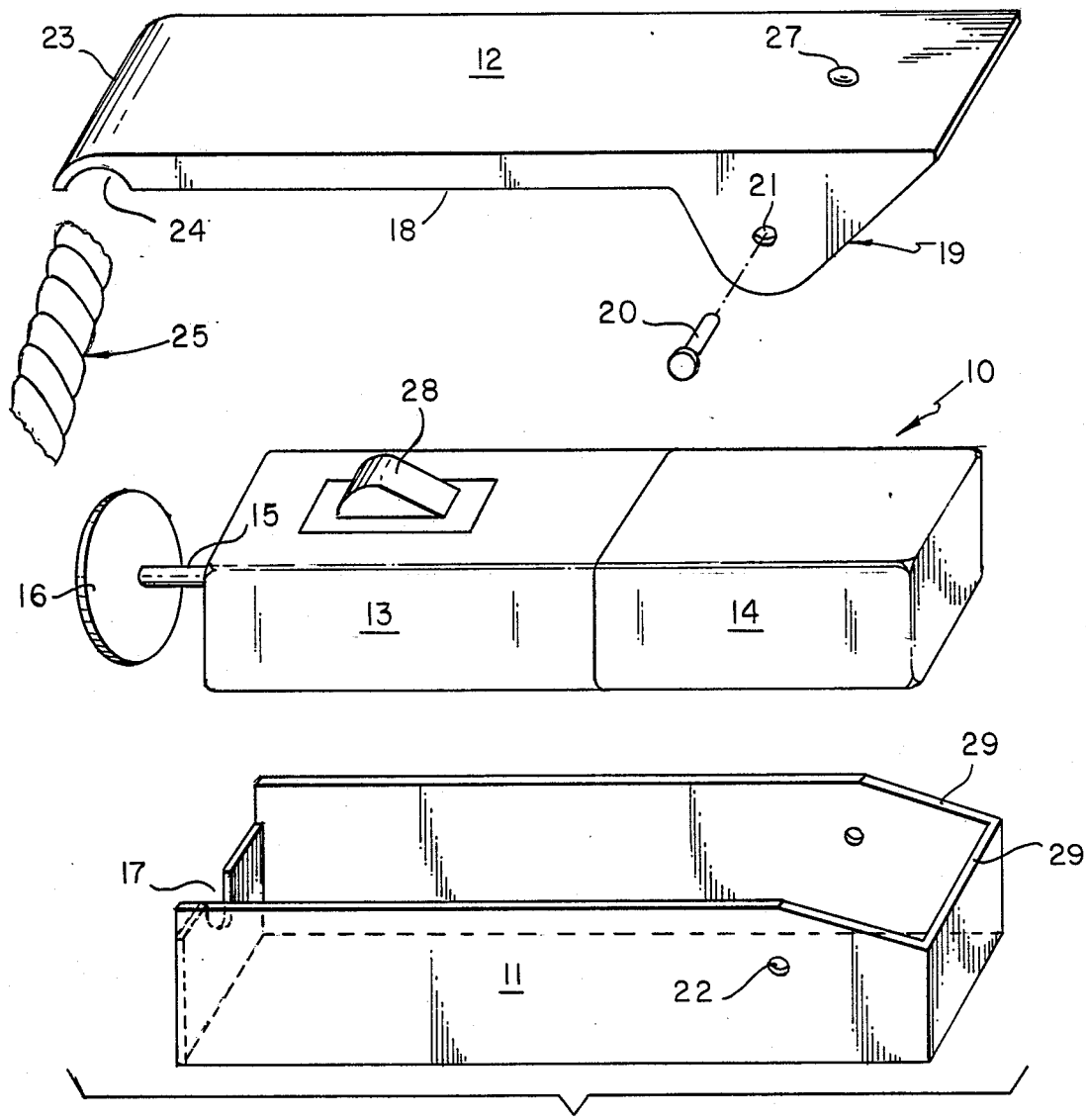
FIG. 1 is an exploded isometric view of the device.

Referring to FIG. 1 of the drawings, one embodiment of the invention is shown comprising an electrically powered unit 10, a lower containment shell or case 11 into which the power unit is placed, and a hinged cover 12 which forms the top surface of the containment shell.

The power unit consists of an electric motor 13, and an attached rechargeable battery pack 14.

A rotary cutting blade or saw 16 is attached to the end of a drive shaft 15 which projects from said motor 13.

Battery powered hand tools and the technology of rechargeable battery packs for such tools are old in the art.

The combination of electric motor 13 and battery pack 14 is configured to make a snug fit into the containment shell 11. The drive shaft 15 projects through a slot 17 that is fashioned in one end of the containment shell 11.

The cover 12 in this embodiment is fashioned to include integral downturned sides or skirts 18 which overlap the sides of the containment shell 11. Said skirts 18 are fashioned with further downwardly projecting portions 19 which provide a means of rotatably attaching said cover to the sides of the containment shell 11. Said rotatable attachment in this embodiment is accomplished by means of rivets 20 projecting through holes 21 in the downwardly projecting portions 19 and into holes 22 in the sides of the containment shell 11.

The end of the cover opposite said downwardly projecting portions 19 is fashioned as an arcuate, downturned portion 23 which overextends the length of containment shell 11. Said skirts 18 are fashioned with arcuate cut-outs 24 which, in combination with said downturned portion 23, forms a channel into which can be placed a segment of continuous shielded cable 25.

Figure 2:
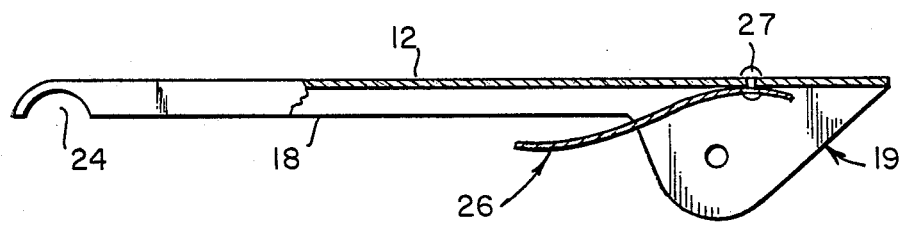
FIG. 2 is a cut away side view of the cover showing the untensioned configuration of the leaf spring.
Figure 3:
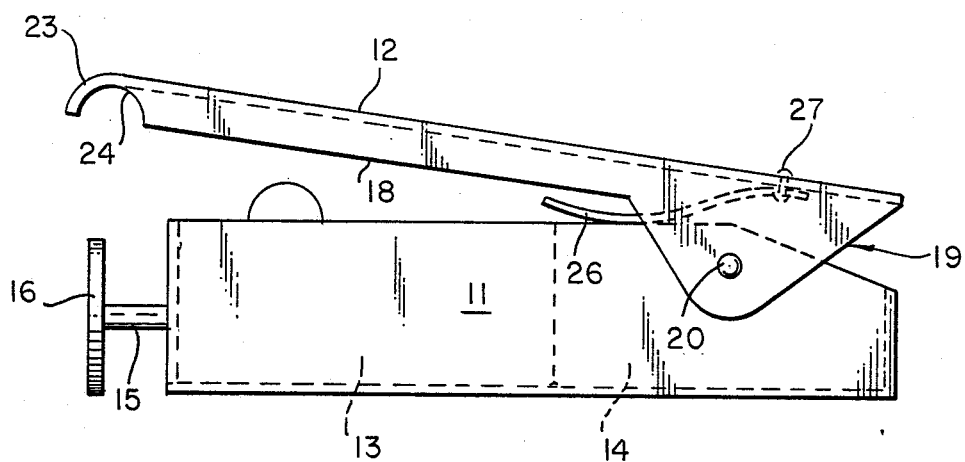
FIG. 3 is a side view of the invention with the cover open.
Figure 4:
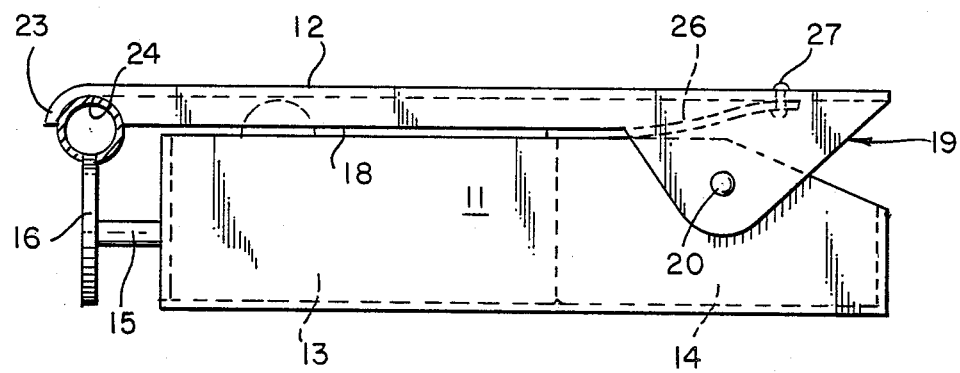
FIG. 4 is a side view of the invention with the cover closed.

Referring now to FIG. 2, said cover 12 is further fashioned with a downwardly projecting leaf spring 26 which is attached to the inner surface of the cover 12 by means of a rivet 27 or the like.

The top surface of said electric motor 13 is fashioned with an upwardly projecting, spring-loaded, contact switch 28. Said switch 28 is designed to be depressed by the inner surface of cover 12 as said cover is being closed. The cutting blade 16 and shaft 15 are activated as switch 28 becomes depressed.

With cover 12 fully closed and switch 28 fully depressed a segment of shielded cable 25 as laid into said downturned channel portion 23 can be pressed into contact with the cutting edge of blade 16.

Said downwardly projecting leaf spring 26 bears slideably upon the top surface of said power unit 10. When no pressure is applied to the top surface of cover 12, leaf spring 26 holds said cover open sufficiently to avoid contact between cover 12 and switch 28. As pressure is applied to cover 12, tension increases in spring 26 as the free end of said spring slides along the surface of power unit 10. The tension in spring 26 causes cover 12 to open whenever pressure is released enabling the user to move the device quite freely along the length of shielded cable 25.

One end of containment shell 11 is fashioned with a biased cut 29 in such a manner that said biased cut 29 operates as a stop and limits the angle through which cover 12 can open. The aforesaid limitation enables cover 12 to open sufficiently to enable the user to remove the cutting unit 10 but restricts the cutting unit from falling out accidentally.

I claim:

1. A hand-held cutting tool for use on shielded electric cable comprising:
   an electric motor and attached battery pack adapted to fit into a containment shell with hinged cover,
   a drive shaft projecting outwardly from said electrical motor so as to pass through a slot in one end of said containment shell,
   a rotary cutting blade affixed to the end of said outwardly projecting drive shaft,
   a springloaded contact switch which projects upwardly from said electric motor so as to be capable of being depressed by contact with the inner surface of said hinged cover, and
   a downwardly projecting leaf spring attached to said inner surface of said hinged cover.

2. The invention recited in claim 1 wherein said downwardly projecting leaf spring bears slideably upon the surface of said electric motor and attached battery pack.

3. The invention recited in claim 1 wherein said containment shell is fashioned with stops which limit the angle through which said hinged cover can open.

4. The invention recited in claim 1 wherein said hinged cover overextends said outwardly projecting shaft and rotary blade, said hinged cover further being fashioned with arcuate cut-outs directly over and facing said rotary blade.

* * * * *